March 9, 1948.  S. V. E. TAYLOR  2,437,448
HYDRAULIC TRANSMISSION
Filed Dec. 1, 1943  2 Sheets-Sheet 1

INVENTOR
SCOTT V. E. TAYLOR
BY P. H. Lamphere
ATTORNEY

March 9, 1948.    S. V. E. TAYLOR    2,437,448
HYDRAULIC TRANSMISSION
Filed Dec. 1, 1943    2 Sheets-Sheet 2

INVENTOR
SCOTT V. E. TAYLOR
BY P. H. Lamphere
ATTORNEY

Patented Mar. 9, 1948

2,437,448

UNITED STATES PATENT OFFICE 2,437,448

HYDRAULIC TRANSMISSION

Scott V. E. Taylor, Cleveland, Ohio

Application December 1, 1943, Serial No. 512,464

16 Claims. (Cl. 192—61)

My invention relates to hydraulic transmissions and more particularly to one of the jet reaction type, said invention having for its general object to improve the hydraulic transmission disclosed in my Reissue Patent No. 20,988, issued January 24, 1939.

A more specific object of my invention is to produce a hydraulic transmission of the type referred to in which a more compact and efficient relationship of the parts is obtained, particularly in connection with the pumps and associated means carried by the rotor.

Another object of my invention is to produce a hydraulic transmission construction in which the efficiency is increased as a result of so arranging the parts as to decrease both mechanical and hydraulic friction and also excessive skin friction between moving surfaces contacted by liquid.

Yet another object of my invention is to provide an improved arrangement of the intake and exhaust passages for the pumps together with improved exhaust passage design and valve means therefor to maintain a constant pressure in said passage.

Further objects of my invention are to produce a hydraulic transmission which is simple in construction and arrangement of parts, readily assembled and economically manufactured and one which has an increased torque over prior hydraulic transmissions operating under similar needs.

Figure 1:
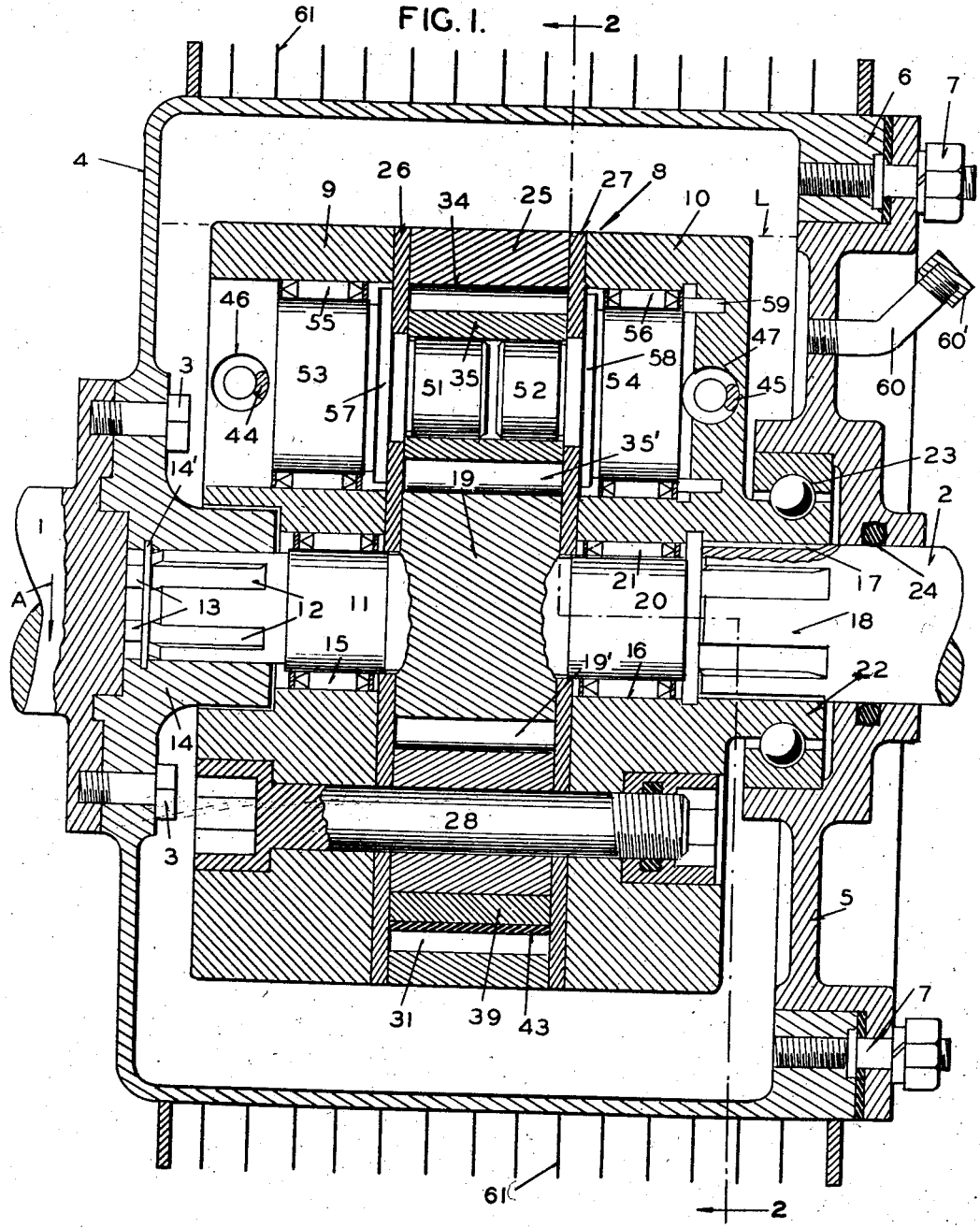
Figure 2:
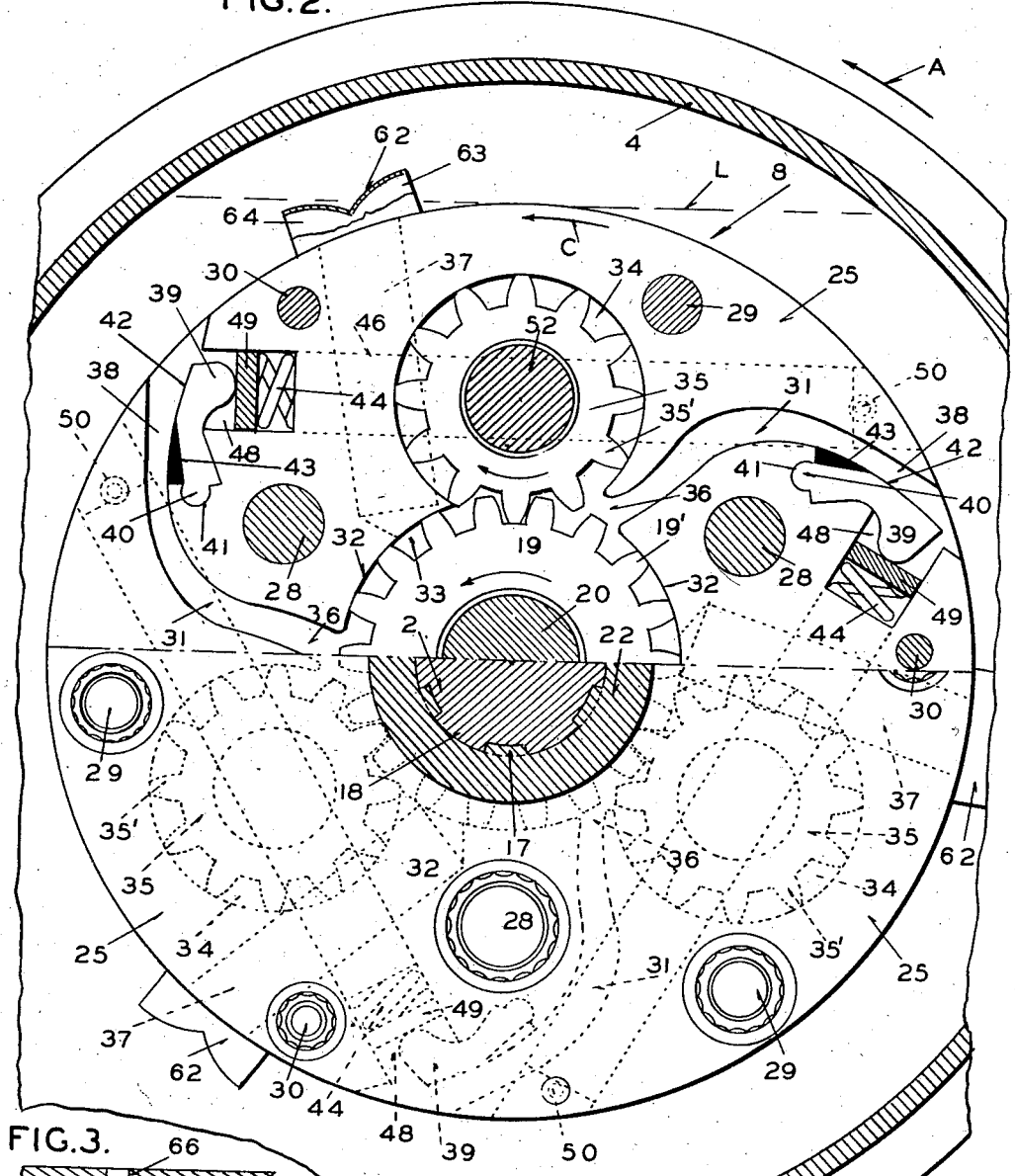
Figure 3:
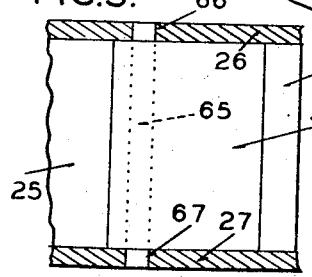

Other objects of my invention will become apparent from the following description taken in connection with the accompanying drawings in which Figure 1 is a vertical sectional view of a hydraulic transmission embodying my invention; Figure 2 is a sectional view taken on the line 2—2 Figure 1; and Figure 3 is a view of a modified live mounting.

Referring to the drawings in detail, numeral 1 indicates the driving shaft of the transmission and 2 the driven shaft thereof. The driving shaft, which is driven by a prime mover has a cup-shaped casing 4 connected thereto by means of bolts 3, said casing being closed at its open end by a closure plate 5 which is secured to a flange 6 by means of suitable fastening studs and nuts 7. Within the cup-shaped casing is a rotor generally indicated by the numeral 8, this rotor being spaced from casing 4 and connected for rotation with the driven shaft 2. The rotor has end sections 9 and 10, section 9 being mounted for rotation on a stub shaft 11. This stub shaft is in axial alignment with the driving shaft and connected thereto in order to be rotatable with the shaft and the cup-shaped casing. The stub shaft has a splined portion 12 which cooperates with internal splines 13 on a flange 14 extending inwardly from the closed end of the cup-shaped casing. Roller bearings 15 are provided between section 9 and the stub shaft and a "Welsh" plug 14' is provided to seal the end of the stub shaft beyond the splines. The other end section 10 of the rotor is provided with a bore 16 for receiving the inner end of driven shaft 2, a portion of said bore having splines 17 for cooperation with splines 18 on the driven shaft, thus providing a driving connection between the rotor and the driven shaft. The stub shaft 11 is formed as an integral extension from one side of a gear 19 and the other side of this gear is also provided with an integral stub shaft extension 20 which extends into bore 16 of end section 10 of the rotor, a roller bearing 21 being provided between the shaft and section. The end section 10 is provided with an annular flange 22 which is journaled in closure plate 5 by means of a bearing 23. A portion of the closure plate closely surrounds driven shaft 2 and carries an "O"-ring seal 24 to prevent any leakage of fluid from the interior of casing 4.

Three like irregularly-shaped sections 25 and wear plates 26 and 27 are provided between the end sections 9 and 10 of rotor 8, wear plate 26 being interposed between section 9 and sections 25 and wear plate 27 between section 10 and sections 25. The thickness of each section 25 is the same as the width of gear 19 and the wear plates fit closely against the end surfaces of gear 19 to provide a seal for the gear. Sections 25, wear plates 26 and 27, and the end sections 9 and 10 of the rotor are all held in assembled relation by three sets of bolts 28, 29, and 30 of different sizes, each set of bolts passing through a section 25 as best shown in Figure 2. The heads of the bolts are inset in end section 9 and the nuts therefor are inset in end section 10 in order to eliminate projections on the rotor.

Sections 25 are so shaped that when mounted between sections 9 and 10 in circumferential relation they form three passages 31 leading outwardly from gear 19 and opening into the periphery of the rotor in a general tangential direction as shown. The inner edges of each section have a curved surface 32 in the form of a segment of a cylinder and together these cylindrical surfaces form a chamber 33 within which gear 19 rotates. The cylindrical surface cooperates with the end surfaces of teeth 19' of the gear to form a seal. Each section 25 is also shaped to form a substantially closed cylindrical chamber 34, the three chambers being spaced 120° about the axis of gear 19. Closely fitted within each chamber 34 is a spinner 35 in the form of a gear, the teeth 35' of which mesh with the teeth of gear 19. Gear 19 and gears 35, together with sections 25, provide three gear pumps, each of which is capable of forcing fluid into the inlet end 36 of passage 31, which inlet is arranged to be closely adjacent the meshing area of the gears. Each section 25 also has a drilled passage 37 which intersects the cylindrical chamber 34 and enters chamber 33 in which gear 19 rotates. Each passage 37 permits liquid to flow from the exterior of the rotor to a pump at a point adjacent the meshing area of the gears but on the side opposite the inlet end 36 for the exhaust passage 31.

Each of the passages 31 forming the exhaust passages for the pumps is arranged to be of the converging type, that is, they converge toward the outlet end 38 which empties into the space between the rotor and the external casing 4 in a general tangential direction as already noted. Since this exhaust passage has its outlet at the periphery of the rotor, the force resulting from the exhaust fluid will thus have an operating arm substantially greater than the pitch radius of the driving gear 19. Associated with each outlet end of passage 31 is a valve element 39 pivotally mounted in a section 25 by means of a cylindrical portion 40 received in a cylindrical socket 41. A yieldable filler material 43 is provided in the space between passage surface 42 of the valve element and the portion of section 25 adjacent the pivot joint of the valve element, said filler material being secured to the section and the valve element as by binding. This material provides a smooth wall for the outlet port of passage 31 and yet permits the valve element to pivot and control the extent of opening of the outlet end 38. The surface 42 of the valve element, the yieldable filler material 43, and the converging relation of the walls of passage 31 are so arranged that when the valve is fully open, passage 31 has a cross-section shape similar to a Venturi tube and when the valve is almost closed, the cross-section shape of the outlet end is similar to that of a converging type fire hose nozzle with an included angle, for example, as of 13 degrees, 24 minutes.

Each valve element 39 is adapted to be acted upon by two springs 44 and 45 which normally apply forces moving the valve element to closed position, thus preventing flow of liquid out of passage 31. The spring 44 is positioned in a bore 46 extending through section 9 of the rotor and spring 45 is positioned in a bore 47 in section 10 of the rotor. The outer ends of the bores in which the springs lie open into a rectangular slot 48 which extends axially across the rotor being formed by cut-outs in sections 9 and 10, wear plates 26 and 27, and each section 25. Each slot receives a rectangular bar 49 which is interposed between the ends of springs 44 and 45 and the outer curved end of valve element 39, thus providing means whereby the springs can apply a force to the valve element which lies between the ends of the springs. The end of each spring opposite the end acting upon the valve element is held in its bore by a screw pin 50. When the transmission is not in operation, the springs will act on the valve elements to hold them in closed positions, thus closing the passages 31. All the springs are alike and are designed so that each pair will apply a predetermined closing force to each valve element.

Each gear 35 is provided with two mounting shafts 51 and 52 which extend from opposite sides of the gear, the shafts being secured to the gear by being pressed into the bore thereof. The end portion 53 of shaft 51 and the end portion 54 of shaft 52, which extend from opposite sides of the gear, are enlarged, as best shown in Figure 1. The portion 53 is journaled in the end section 9 by roller bearings 55 and portion 54 is mounted in the end section 10 of the rotor by roller bearings 56. Shaft 51 is formed with a flange portion 57 for cooperation with the outer surface of wear plate 26 and shaft 52 has a flange portion 58 for cooperation with the outer surface of wear plate 27. These flanges in cooperation with the wear plates provide extra sealing means for gear 35 and chamber 34 thereof. A double sealing arrangement is provided by the end surfaces of the gear engaging the inner surfaces of the wear plates and the flanges engaging the outer surfaces of the wear plates. Pins 59 are provided for holding the roller bearings 56 of shaft 52 in position.

The casing 4 is adapted to be filled with a suitable liquid to any desired level line such as that indicated at "L" and to accomplish this, a filler pipe 60 is provided which is closed by a cap 60'. This pipe is so arranged that when all possible liquid is put into the casing through the pipe, the level line will be at the proper height. The external surface of casing 4 is also provided with suitable fins 61 in order to facilitate a rapid dissipation of heat during operation of the transmission.

The operation of my improved hydraulic transmission is as follows: The driving shaft is rotated in the direction indicated by the arrow "A" in Figures 1 and 2. Since both gear 19 and casing 4 are connected to the driving shaft, their direction of rotation will be the same as that of the driving shaft. With gear 19 rotating in the counter-clockwise direction as viewed in Figure 2, gears 35 will be driven in a clockwise direction as seen in the same figure. Rotation of the gears will cause the three pumps to operate and each pump will cause liquid under pressure to be developed in a passage 31 which will be forced through the outlet end 38 into the space between casing 4 and the rotor. In order to be forced out of passages 31, the liquid must open valve 39 against the action of springs 44 and 45. Since valves 39 tend to close passages 31, it is seen that a load will be imposed upon the gears and consequently, the rotor will be caused to rotate in the direction indicated by the arrow "C" and gears 35 will rotate about the axes of the driving and driven shafts of gear 19. With rotation of the rotor, the driven shaft 2 will be rotated. If there is a load on the driven shaft, it will also be applied to the rotor and tend to prevent rotation thereof. This load causes gears 35 to be rotated about their own axes by gear 19 to bring about the pumping operation for developing liquid pressure in passages 31.

As already noted, springs 44 and 45 apply a substantially constant force to each valve element 39 to bias it toward closed position. The valves are so arranged that the liquid pressure in passage 31 will act against the closing force of the springs. Thus these springs working through the valves will tend to maintain a substantially constant liquid pressure in passages 31. When the load on the driven shaft is large, the rotor and, therefore, the planet gears will be held against rotation about the axis of gear 19 but can be rotated about their own axes against the load imposed by the valve element. The volume of fluid being pumped will be large, and for this volume to be exhausted, the valve 39 will be opened against the constant spring force. The liquid pressure in passage 31, however, will remain substantially constant. As the load on the driven shaft decreases, the constant liquid pressure maintained in passage 31 will cause the rotor to increase in speed and the difference of speed between the driving shaft and driven shaft will decrease. With this decrease in difference in speed, the rate of rotation of the planet gears about the axis of gear 19 will increase and the rate of rotation about their own axes will decrease. As a result a less volume of fluid will be pumped and the valves will be closed farther under the action of the springs. As the load further decreases on the driven shaft, the speed of the rotor will further increase with a resultant decrease in the puumping action of the pumps and further closing of valve elements 39. There will be further decrease of rate of rotation of the planet gears about their own axes as the load on the driven shaft decreases further until the difference in rotation between the rotor and the driving shaft is small and the speed ratio between the shafts is substantially 1 to 1 or direct drive. At this time there will be a little pumping action by the gears as the load imposed on the planet gears by the valves prevents their rotation about their own axes. The torque being transmitted to pick up the load on the driven shaft is accomplished by the gear thrust action between the sun gear and the planet gears and the jet reaction of the liquid being exhausted through passage 31 which has a particular contour so that it is exhausted in a general tangential direction as previously noted. The sum of the two forces, that is, the forces resulting from the gear thrust action and the jet reaction multiplied by their respective arms about the axis of the rotor divided by the torque input gives the torque multiplication. Due to the fact that the jet reaction is acting through an arm substantially greater than the pitch radius of the driving gear 19 there will be a substantial increase in torque output over an arrangement where there is no jet reaction or it acts through an arm less than the pitch radius of the driving gear.

From the foregoing it is seen that the hydraulic transmisison operates automatically to give infinite speed ratios between the driving and driven shafts. As the torque necessary to move the load decreases, the difference in speed between the driving and driven shafts decreases. Everything about the transmission is automatic and the torque transmitted will be at the ratio required for the load. The torque input, however, remains substantially constant regardless of differences in speeds between the driving and driven shafts.

It is to be noted that the entire construction of the transmission is very simple as the rotor is comprised essentially of only two end sections and three inner sections. The chambers for the gears of the pumps are formed by the wear plates and the three like central sections which are so irregularly-shaped that when properly positioned they form the chamber for the central gear, the chambers for the planet gears, and the exhaust passages for the pumps. The valves are of simple construction and are directly operated upon by springs which are of the coil type and can be accurately constructed to give the proper application force. The outer casing 4, which rotates the driven shaft, is spaced from the rotor, thus causing a considerable decrease in any skin friction resulting from the contact of the liquid with the surface of the rotor and the casing. The pumps are of very simple construction requiring only a single sun gear and three planet gears. They are all embodied within the rotor, thus streamlining the exterior thereof in order to decrease hydraulic friction.

It may be desirable to provide suitable scoops to insure that sufficient liquid enters the intake passages for the pumps under all conditions. This can be accomplished by means of the specially designed scoops 62 shown in Figure 2. These scoops are arranged so that they will pick up liquid in either direction and direct the liquid toward the intake passages 37. When there is a large load on the driven shaft, the driving shaft will be rotating at a greater speed than the driven shaft and consequently it will tend to carry the liquid which is in the space between the casing and the rotor in the direction of rotation of the casing. Under these conditions portion 63 of the scoop which opens toward the rotating liquid will direct liquid into the intake passages. When the casing and rotor are rotating at substantially similar speeds, the inertia of the liquid may be such that it will not move as rapidly as the rotor and the casing so that liquid can enter the scoop portion 63. However, the other scoop portion 64 which opens in the opposite direction will pick up sufficient liquid to keep the intake passage 37 supplied. The liquid being exhausted to passages 31 will also have an effect upon the relative movements of the liquid with respect to the rotor and casing. However, by providing the double scoop arrangement, as shown, then regardless of the conditions present the intake passage 37 will be supplied with sufficient liquid.

In Figure 3 I have shown a slightly modified construction for pivotally mounting the control valve for passage 31. As shown, the valve element 39' carries a pin 65 which extends from opposite sides of the valve element and is axially aligned with the desired pivotal axis of the valve element. These extending ends of the pin have bearing mounting in openings 66 and 67 of the wear plates. By means of this arrangement the yieldable material can be eliminated and the contour of the valve element arranged to be continuous with the contour of section 25 at the pivoted end of the element and thus provide a smooth wall at the outlet end of passage 31.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a hydraulic transmission, a driving member, a driven member, a rotor connected to the driven member, a gear pump associated with the rotor and comprising meshing gears journaled in the rotor and positioned within the outlines thereof, one of said gears constituting a driving gear having an axis coinciding with the rotor axis, means for driving one of the gears from the driving member, said rotor being provided with an inlet passage from the exterior of the rotor to the pump and an exhaust passage from the pump to the exterior of the rotor and capable of discharging the liquid from the rotor at an angle to a radial line of the rotor so chosen that the reaction force produced by the discharged liquid will act on the rotor at a distance from its axis substantially greater than the pitch radius of the driving gear, and automatically operable means for maintaining a substantially constant liquid pressure in the exhaust passage.

2. In a hydraulic transmission, a driving member, a driven member, a liquid containing casing connected to the driving member to rotate therewith, a rotor in the casing spaced a substantial distance from the walls thereof and connected to the driven member, a chamber in the rotor, a spinner in the chamber journaled in the rotor, means for supplying liquid to the spinner chamber and for exhausting it therefrom through a smooth curved passage so arranged and extending to the exterior of the rotor at an angle to a radial line as to produce a reaction force on the rotor acting at a substantial distance from the axis of the rotor and in a direction to aid in the rotation of the rotor, means for driving the spinner from the driving member to thereby cause the spinner to force fluid out of the exhaust passage, and spring-biased valve means for automatically controlling the extent of opening of the exhaust passage to maintain substantially uniform liquid pressure therein at all speeds of the driven members and being so associated with the open end of the exhaust passage as to cause no substantial change in direction of flow of fluid as it passes to the exterior of the rotor other than as determined by the curvature of the exhaust passage.

3. In a hydraulic transmission, a driving member, a driven member, a rotor connected to the driven member, pump means associated with the rotor, means for driving the pump means by the driving member, a liquid supply, means for connecting the supply to the pump intake, means providing a smooth walled exhaust passage in the rotor from the pump to the exterior of the rotor, said exhaust passage being so shaped as to cause pumped liquid to converge toward its outlet end and arranged and curved as to discharge liquid from the rotor in a general tangential direction and opposite the direction of rotation of the rotor to thus produce a reaction force on the rotor acting at a substantial distance from its axis and in a direction to aid in the rotation of the rotor, and spring-loaded valve means for maintaining the liquid in the exhaust passage under pressure without any substantial change in its direction and type of flow as determined by the shape and curvature of the exhaust passage, said spring of the valve acting on the valve with such uniform force as to automatically maintain the input torque substantially constant at all discharge rates of the liquid.

4. In a hydraulic transmission, a driving member, a driven member, a rotor connected to the driven member, a casing surrounding the rotor in spaced relation and containing liquid, a gear pump associated with the rotor and comprising a gear mounted for rotation on an axis coinciding with the axis of the rotor and a second gear meshing with the first gear and mounted for rotation in the rotor on an axis eccentric to the rotor axis, means providing an inlet passage to the pump from the space between the rotor and casing, means providing an exhaust passage from the pump to the exterior of the rotor and capable of discharging liquid from the rotor at an angle to a radial line thereof, said exhaust passage being so curved that the discharged liquid will produce a reaction force on the rotor acting at a distance from the rotor axis substantially greater than the pitch diameter of the first gear, and spring-biased valve means for controlling the exhaust passage and maintaining pumped liquid pressure therein at a substantially constant value.

5. In a hydraulic transmission, a driving member, a driven member, a rotor connected to the driven member, a gear journaled in the rotor and having its axis coinciding with the axis of said rotor, a second gear journaled in the rotor and meshing with the first gear, said rotor and gears being so arranged as to provide cylindrical chambers for the gears, means for supplying liquid to the chambers of the gears in such manner as it will be placed under pressure by the rotation of the gears, means providing an exhaust passage for the liquid pressure, and spring-biased valve means for maintaining the liquid in the exhaust passage under a substantially constant pressure, said exhaust passage being so arranged as to discharge liquid from the rotor in a general tangential direction and away from the direction of rotation of the rotor and the perpendicular distance between the said tangential direction and the rotor axis being substantially greater than the pitch diameter of the first gear.

6. In a hydraulic transmission, a driving member, a driven member, a liquid containing casing connected to the driving member, a rotor in the casing spaced from the walls thereof and connected to the driven member, a chamber in the rotor, a spinner in the chamber journaled in the rotor, means for supplying liquid to the spinner chamber and for exhausting it therefrom through a passage extending to the exterior of the rotor, means for driving the spinner from the driving member to thereby cause the spinner to force liquid out of the exhaust passage, and spring-biased valve means for controlling the exhaust passage, said exhaust passage being so arranged as to discharge liquid from the rotor in a general tangential direction and having smooth curved walls and being so constructed to cause the liquid flowing therethrough to converge toward the outlet end.

7. In a hydraulic transmission, a driving member, a driven member, a liquid containing casing connected to the driving member, a rotor in the casing spaced from the walls thereof and connected to the driven member, a chamber in the rotor, a spinner in the chamber journaled in the rotor, means for supplying liquid to the spinner chamber and for exhausting it therefrom through a passage extending to the exterior of the rotor, means for driving the spinner from the driving member to thereby cause the spinner to force liquid out of the exhaust passage, and a spring-biased valve element for controlling the exhaust passage, said exhaust passage being so arranged as to discharge liquid from the rotor in a general tangential direction and having smooth curved walls and being so constructed to cause the liquid flowing therethrough to converge toward the outlet end and said valve element being so constructed that it will form a portion of the wall of the converging passage when substantially closed and when open will cause the passage to diverge at its discharge end.

8. In a hydraulic transmission, a driving member, a driven member, a rotor connected to the driven member, pumping means associated with the rotor, means for driving the pumping means by the driving member, a liquid supply connected to the inlet of the pump, means providing an exhaust passage in the rotor from the pump and discharging to the exterior of the rotor, and a spring-biased pivoted valve element associated with the exhaust passage, said exhaust passage converging toward the discharge end and said valve element being so formed and associated with the passage that when closed there results a continued convergence of the exhaust passage and when fully opened there results a gradual divergence of the exhaust passage following convergence.

9. In a hydraulic transmission, a driving member, a driven member, a rotor connected to the driven member, pumping means associated with the rotor, means for driving the pumping means by the driving member, a liquid supply connected to the inlet of the pump, means providing a curved passage in the rotor from the pump and discharging to the exterior of the rotor in a general tangential direction opposite that of the direction of rotation of the rotor, and a spring-biased pivoted valve element associated with the exhaust passage, said exhaust passage converging toward the discharge end and said valve element being so formed and associated with the passage that when closed there results a continued convergence of the exhaust passage and when fully opened there results a gradual divergence of the exhaust passage following convergence.

10. In a hydraulic transmission, a driving member, an axially-aligned driven member, a rotor connected to the driven member, said rotor comprising end sections and separate irregularly shaped central sections secured together, said central sections being so shaped and associated with each other when mounted between the end sections as to provide a central chamber, radially-positioned cylindrical chambers communicating with the central chamber and curved exhaust passages of a width equal to the thickness of the central sections and leading from the central chamber to the exterior of the rotor at a general tangential direction to its surface, a gear mounted in the central chamber and connected to be driven by the driving member, a gear in each cylindrical chamber and meshing with the first named gear, means for providing an inlet passage from the exterior of the rotor to each cylindrical chamber, and a spring-biased valve means for controlling each exhaust passage and being so arranged and associated therewith as not to substantially modify in all operative positions the direction of flow of liquid as determined by the curvature of said exhaust passage and at the same time so automatically control the passage as to insure a smooth torque output resulting from gear thrust action and jet reaction of the liquid.

11. In a hydraulic transmission, a driving member, an axially-aligned driven member, a cylindrical casing connected to be driven by the driving member, a rotor connected to the driven member and positioned in the casing in spaced relation to the walls thereof, said rotor comprising end sections and a plurality of independent irregularly shaped central sections secured together, said central sections being so shaped and associated with each other when mounted between the end sections as to provide a central chamber, radially-positioned cylindrical chambers communicating with the central chamber and passages between sections leading from the central chamber to the exterior of the rotor, a gear mounted in the central chamber and connected to be driven by the driving member, a gear in each cylindrical chamber and meshing with the first named gear, means for providing an inlet passage from the exterior of the rotor to each cylindrical chamber, a pivoted valve for controlling each exhaust passage, and a coil spring mounted in each end section and connected to apply a substantially constant force for biasing each valve toward closed position.

12. In a hydraulic transmission, a driving member, an axially-aligned driven member, a rotor connected to the driven member, said rotor comprising end sections and a central section, said central section being arranged to provide a cylindrical chamber, an inlet passage to the chamber and an exhaust passage therefrom, a gear journaled in the rotor and having its axis coinciding with the axes of the driving and driven members, a gear positioned in the cylindrical chamber and meshing with the first named gear, stub shafts connected to and extending from opposite sides of the last named gears, said shafts having enlarged outer ends journaled in the end sections of the rotor, a plate between each end section and the central section for sealing cooperation with the end surfaces of the gears and with said enlarged outer ends of the stub shafts, and spring-biased valve means for controlling the exhaust passage.

13. In a hydraulic transmission, a driving member, a driven member, a rotor connected to the driven member, a pump positioned in the rotor, said rotor being provided with an inlet passage from the exterior of the rotor and an exhaust passage extending to the exterior of the rotor, a valve pivotally mounted to the rotor and associated with the exhaust passage to control the area of the discharge end of the exhaust passage, springs positioned in said rotor on opposite sides of the valve, and a bar extending between the ends of the springs and adapted to transfer force from the springs to the valve to bias it to closed position.

14. In a hydraulic transmission, a driving member, a driven member, a rotor connected to the driven member and comprising a central section and end sections, a pump positioned in the central section of the rotor, said central section of the rotor being provided with an inlet passage from the exterior of the rotor and an exhaust passage extending to the exterior of the rotor, a pivoted valve associated with the exhaust passage to control the area of the discharge end of the exhaust passage, coil springs positioned in the end sections of said rotor on opposite sides of the valve, and a bar extending between the ends of the springs and adapted to transfer force from the springs to the valve to bias it to closed position.

15. In a hydraulic transmission, a driving member, a driven member, a liquid containing cylindrical casing connected to the driving shaft, a rotor positioned in the casing in spaced relation from its walls and connected to the driven member, pump means positioned within the rotor and driven by the driving member, said rotor being provided with an inlet passage from the exterior of the rotor to the pump and an exhaust passage from the pump to the exterior of the rotor, a double scoop means carried by the rotor and arranged for directing liquid from the space between the rotor and casing wall into the inlet passage when the rotor is moving more rapidly than the liquid in the same direction or the liquid is moving more rapidly than the rotor in the same direction, and a spring-biased valve for controlling the exhaust passage.

16. In a hydraulic transmission, a driving member, a driven member, a liquid containing casing, a rotor in the casing connected to the driven member, a pump carried by the rotor, gearing means for driving the pump including a driving gear having an axis coinciding with the rotor axis and connected to the driving member, means for supplying liquid to the pump, an exhaust passage leading from the pump and extending to the periphery of the rotor, said exhaust passage between the pump and the exterior of the rotor being curved so as to discharge in a direction at an angle to a radial line and in a direction opposite the rotation of the rotor so as to produce a reaction force on the rotor acting at a distance from the axis of the rotor and which distance is substantially greater than the pitch radius of the driving gear, and spring biased valve means adjacent the outlet end of the exhaust passage for maintaining pumped liquid pressure therein at a substantially constant value.

SCOTT V. E. TAYLOR.

REFERENCES CITED

The following references are of record in the file of this patent:

UNITED STATES PATENTS

| Number | Name | Date |
|---|---|---|
| 1,283,711 | Everett | Nov. 5, 1918 |
| 1,354,228 | Thompson | Sept. 28, 1920 |
| 1,752,385 | Johnson | Apr. 1, 1930 |
| 1,954,418 | Ley | Apr. 10, 1934 |
| 2,066,450 | Bascle et al. | Jan. 5, 1937 |
| 2,318,028 | Thomas | May 4, 1943 |
| 2,371,227 | Dodge | Mar. 13, 1945 |

FOREIGN PATENTS

| Number | Country | Date |
|---|---|---|
| 417,017 | Great Britain | Sept. 26, 1934 |